May 10, 1960 — C. W. FIELD — 2,936,102
ANIMAL BED (CONSTRUCTION)
Filed April 18, 1956 — 4 Sheets-Sheet 1
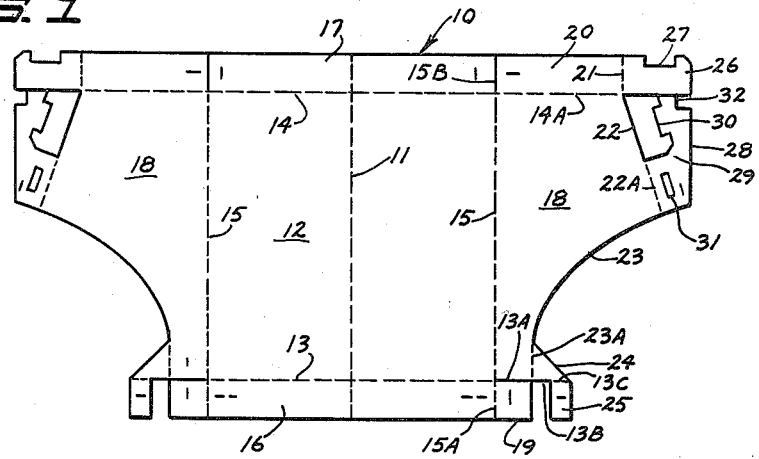
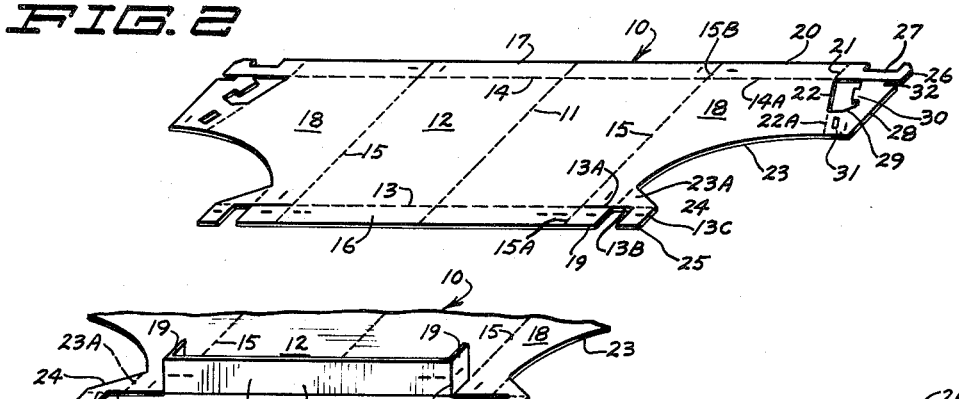
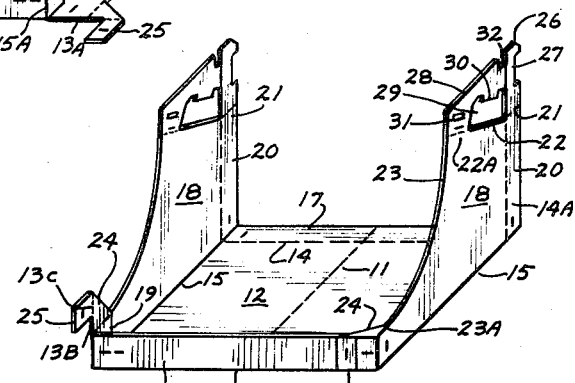
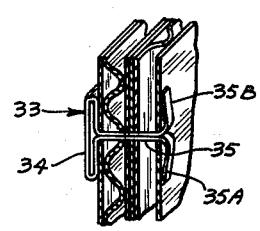
INVENTOR.
CHARLES W. FIELD
BY
ATTORNEYS May 10, 1960  C. W. FIELD  2,936,102
ANIMAL BED (CONSTRUCTION)
Filed April 18, 1956  4 Sheets-Sheet 2

INVENTOR.
CHARLES W. FIELD
BY *Paul, Moore & Dugger*
ATTORNEYS

May 10, 1960    C. W. FIELD    2,936,102
ANIMAL BED (CONSTRUCTION)
Filed April 18, 1956    4 Sheets-Sheet 3
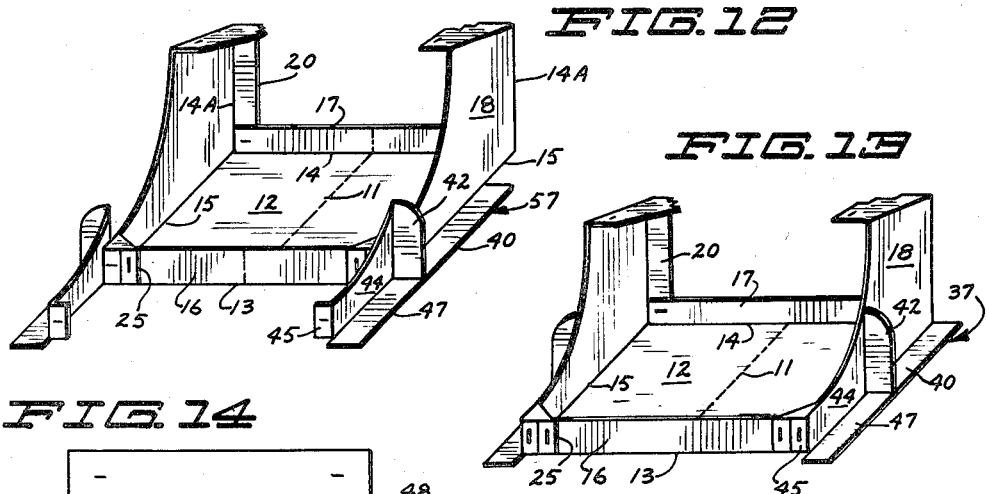
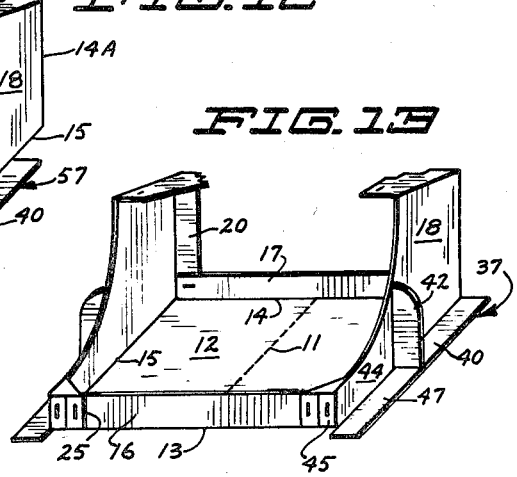
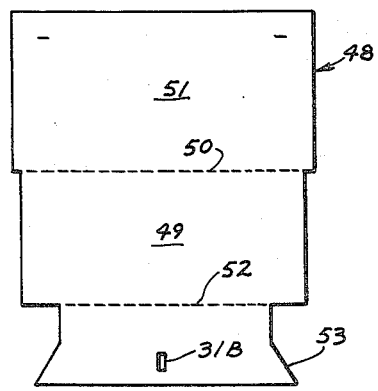
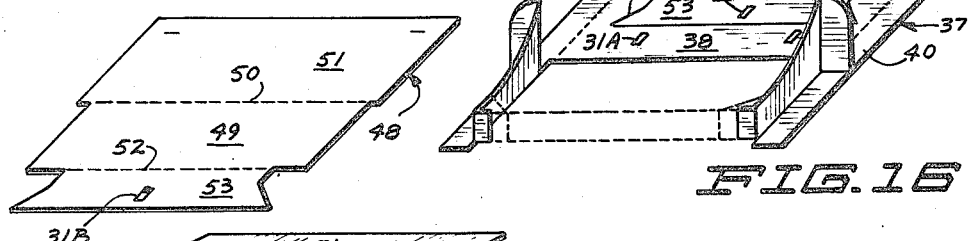
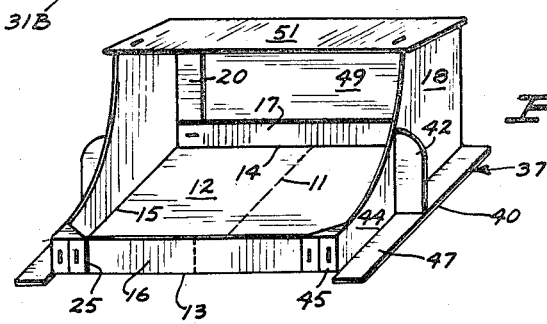
INVENTOR.
CHARLES W. FIELD
BY
ATTORNEYS May 10, 1960     C. W. FIELD     2,936,102
ANIMAL BED (CONSTRUCTION)
Filed April 18, 1956     4 Sheets-Sheet 4
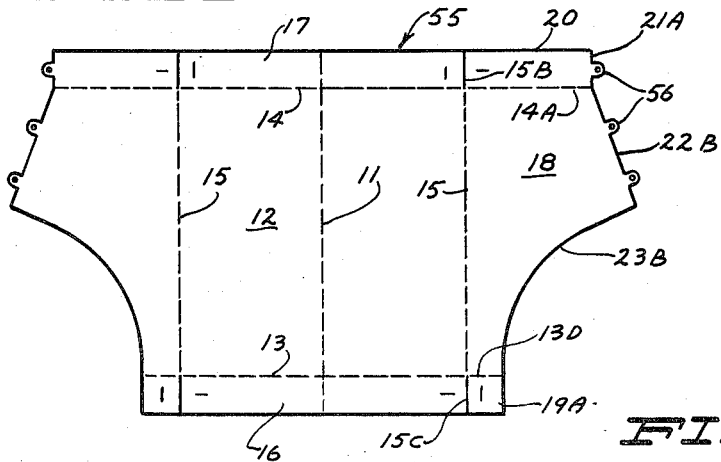
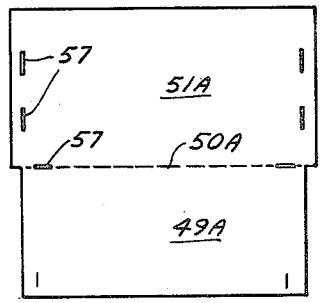
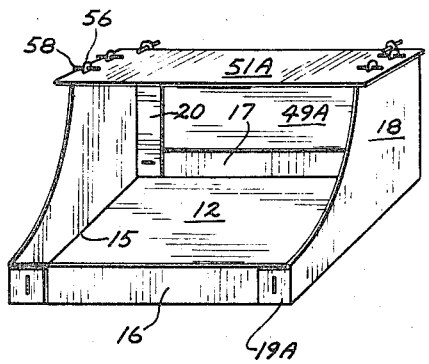
INVENTOR.
CHARLES W. FIELD
BY
ATTORNEYS United States Patent Office 2,936,102
Patented May 10, 1960

2,936,102

ANIMAL BED (CONSTRUCTION)

Charles W. Field, Minneapolis, Minn.

Application April 18, 1956, Serial No. 579,090

8 Claims. (Cl. 229—33)

This invention relates to a bed for animals. More particularly, this invention relates to a bed for household pets, primarily for use indoors, which is constructed of corrugated paperboard or the like.

The principal object of this invention is to provide a relatively inexpensive, light weight animal bed formed by folding corrugated paperboard or the like in the manner described, the bed being adapted to be folded flat for storage or shipment, strong enough to withstand normal usage by dogs, cats, etc. and readily disposable at the end of its useful life.

It is an object of this invention to provide a structure which partially encloses a sleeping animal to contain body warmth and to protect against drafts while at the same time providing for thorough ventilation and easy access by means of an open front and partially uncovered portion of the bed. The bed of this invention has a pleasing appearance and is adapted to be provided with decoration and ornamentation in simulation of human habitation.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

Figure 1 is a plan view of the structural member from which the front and sidewalls and floor of the bed are formed;

Figure 2 is an isometric view of the member of Figure 1;

Figures 3 through 5 are isometric views showing successive steps followed in folding the floor and sidewall member;

Figure 12 is an isometric view showing the folded floor and sidewall member being inserted into the folded base member;

Figure 13 is an isometric view of the assembled floor and sidewall and base members;

Figure 14 is a plan view of the structural member from which the back and roof of the bed are formed;

Figure 15 is an isometric view of the member of Figure 14;

Figure 16 is an isometric view showing the folding and attachment of the back and roof member;

Figure 17 is an isometric view of the completely assembled bed;

Figure 20 is an enlarged isometric view in section showing one form of paper fastening element which may be used in the assembly of the bed of this invention;

Figure 21 is a plan view of a modified form of structural member from which the front and sidewalls are formed;

Figure 22 is a plan view of a modified form of structural member from which the back wall and roof are formed; and Figure 23 is an isometric view showing the members of Figures 21 and 22 when assembled.

Figure 5:
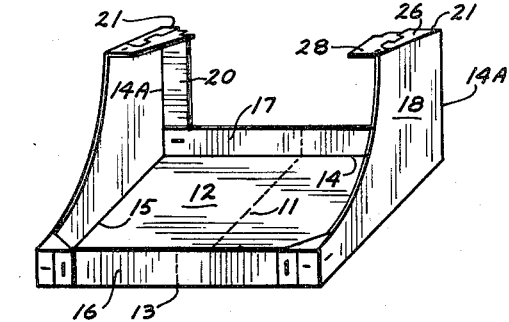

Broadly speaking, the bed of this invention comprises a housing having a floor, front, back and sidewalls and a roof. It is adapted primarily for indoor use and to rest on a floor. To provide easy access for the pet and adequate ventilation the bed has a low front wall and a portion of the sidewalls is cut away to meet the low front wall. Only about half of the bed is covered by the roof. The roof preferably slopes upward toward the open front and is low so that the structure provides an enclosure which contains and delays the escape of the blanket of warm air surrounding the sleeping animal while at the same time protecting from drafts. In warm weather or when the bed is in a warm place the pet may prefer the open unroofed portion of the bed.

The bed of this invention is preferably formed from corrugated paperboard but obviously other paperboards and equivalent sheet stock may be used without departure from the spirit and scope of this invention.

Referring to the drawings, in Figures 1 and 2 there is shown the principal structural member indicated generally at 10 from which the floor and front and side walls of the finished bed are formed. Member 10 is bisected by a center fold line 11 on which it may be folded for shipping or storage. Since member 10 is symmetrical about the axis of line 11 the individual structural features will be described with reference to one side only, it being understood, that, unless indicated otherwise, corresponding elements are present on the opposite side.

Member 10 comprises a rectangular floor portion 12 bounded by a front fold line 13, a rear fold line 14 and side fold lines 15. An elongated rectangular front wall portion 16 is joined to floor portion 12 along fold line 13 between extensions 15A of fold lines 15. A similar elongated rectangular back supporting portion 17 is joined to floor portion 12 along fold line 14 between cut edges 15B which are extensions of fold lines 15. The sidewall portions 18 have a base coextensive with the sides of floor portion 12 and are joined to the floor along fold lines 15.

The front edges of sidewalls 18 are formed by cut edges 13A which are extensions of fold line 13, the heights of front wall 16 and the front edges of sidewall 18 being substantially equal. A strengthening and reinforcing flap 19 is joined to each end of front wall 16 along fold lines 15A. The rear edges of sidewalls 18 are formed by fold lines 14A which are extensions of fold lines 14. A further rectangular back supporting portion 20 is joined to the rear edge of sidewall 18 along fold line 14A between a cut edge 15B and fold line 21 which projects rearwardly from the upper rear corner of sidewall 18.

The top edge of sidewall 18 is formed by a line

22—22A which in Figure 1 extends angularly outwardly from the back edge of the sidewall to form the base for a sloping roof. The open face edge of sidewall 18 is formed by a sweeping arc 23—23A to the front edge along cut edge 13A.

A substantially right triangular corner strengthening member 24 is disposed with one base formed by a fold line 23A and the other base formed by a line composed of a cut edge 13B and a fold line 13C which are extensions of the line 13—13A. Lines 13B and 13C are preferably of substantially the same length. A rectangular reinforcing and fastening flap 25 is joined to triangular member 24 along fold line 13C adjacent the extremity of member 24.

An interlocking roof supporting flap member 26 is joined along fold line 21 as an extension of back supporting portion 20. Member 26 is provided with a tongue receiving groove 27 along its outermost side edge. The top edge of sidewall 18 is provided with a cooperating interlocking roof supporting flap member 28 joined along fold line 22A. Flap 28 has a cut-out portion 29 generally corresponding in size and shape to the extremities of flap 26 and is provided with a tongue 30 for interlocking with groove 27. Flap 28 is provided with an internal cut-out slot 31 and a cut-out notch or groove 32 in its outer edge for ready insertion of fastening elements as will be explained in detail hereinafter.

In the assembly of the floor and wall portion of the bed the first step, as shown in Figure 3, is to place member 10 on a flat surface and fold up front wall 16 along fold line 13 and then to fold flaps 19 inwardly, folding on fold lines 15A. This forms a vertical front wall and with the vertical flap members 19 defines two front corners. Next, as shown in Figure 4, both sidewalls 18 are folded upwardly in succession along fold lines 15. The front edge 13A of sidewall 18 butts against the ends of front wall 16 at the fold line 15A and encloses flap 19. The corner thus made is secured by inserting a suitable fastener through flap 19 and the adjacent portion of sidewall 18.

One form of fastener which may be used is shown at 33 in Figure 20. This is a common form of fastener which comprises a head 34 from which extends a rounded or pointed bifurcated shank 35 which is readily forced through two thicknesses of corrugated paperboard or the like. The shank members 35A and 35B which extend through the paperboard are spread to secure the fastener in place. Obviously, staples or other equivalent forms of fasteners may likewise be used.

When flap 19 and sidewall 18 have been fastened together the triangular strengthening member 24 projects upwardly as shown on the left-hand front corner in Figure 4. Triangular member 24 is folded downwardly, being folded along fold line 23A, and flap 25 is then folded along fold line 13C to extend downwardly along the outer face of front wall 16 as shown on the front right-hand corner in Figure 4. Flap 25 is then secured to front wall 16 to form a strong reinforced corner.

As shown in Figure 5, the back supporting portion 17 is folded along fold line 14 to project upwardly and supporting portions 20 are folded along fold lines 14A to project inwardly overlapping the ends of back supporting portion 17. Fasteners are inserted through the overlapping segments to secure the back supporting elements together.

Figure 6:
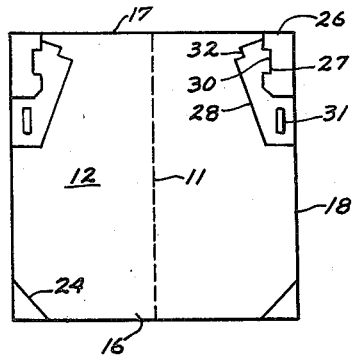
Figure 6 is a top plan view of the bed at the folded stage shown in Figure 5.
Figure 7:
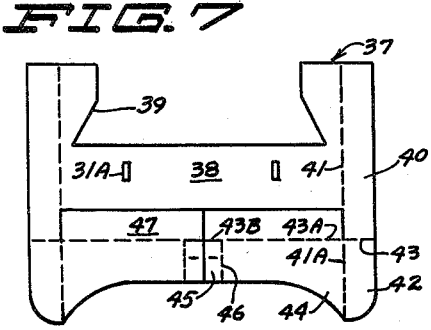
Figure 7 is a plan view of the structural member from which a supporting and reinforcing base for the bed is formed.
Figure 8:
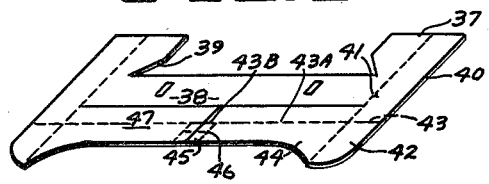
Figure 8 is an isometric view of the member of Figure 7.

As shown in Figures 5 and 6, roof supporting flap 28 is then folded along fold line 22A to project inwardly and cooperating roof supporting flap 26 is folded along fold line 21 to project inwardly and interlock with the cut-out portion 29 of flap 28. Tongue 30 of flap 28 fits into the cooperating groove 27 of flap 26.

Figure 18:
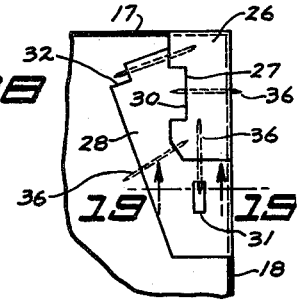
Figure 18 is a detail of one corner interlock from Figure 6, enlarged to show the details of fastening.
Figures 11, 19:
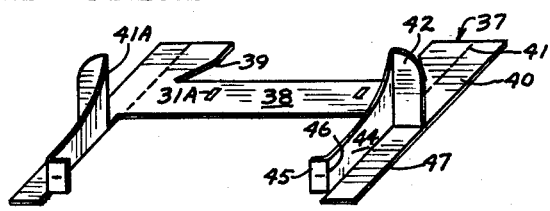
Figure 19 is an enlarged isometric view, partly in section taken on the line 19—19 of Figure 18 and in the direction of the arrows.

To impart strength to the interlocked flaps piercing elongated fastening elements are preferably inserted between the plies of the flaps, as shown in greater detail in Figures 18 and 19. Slots 31 and notches 32 provide ready access to otherwise inaccessible portions of the flaps. Wires, brads, wooden spikes such as toothpicks, or the like may be used as fastening elements. Although shown for clarity in Figure 18 as partially extending, fastening elements 36 are preferably forced between the plies flush with the edge from which they are inserted.

In Figures 7 through 11 there is shown a supporting base member 37 and the manner in which it is folded to form a supporting base. Member 37 includes a rectangular floor portion 38 into the back edge of which a keyway 39 is cut. Floor portion 37 is adapted to lie under the rearward portion of floor 12 of the superstructure in the assembled bed. Lying along the ends of floor portion 38 is a pair of elongated rectangular base extensions 40 joined to floor portion 38 along broken line 41 but longer than the width of portion 38 by approximately their own width.

A reinforcing buttress portion 42 having substantially the same width as base extension 40 is joined to portion 40 along fold line 43 and projects generally as a continuation of base extension 40. A sidewall supporting portion 44 is joined to the buttress portion 42 along fold line 41A which is an extension of broken line 41. A rectangular corner supporting flap 45 is joined to the opposite end of sidewall supporting portion along fold line 46.

The base of the sidewall supporting portion 44 is formed by a fold line 43A which is an extension of fold line 43. The top edge of the sidewall supporting portion 44 is preferably shaped to conform with the forward edge of sidewall 18 against which it abuts in the assembled bed. A further elongated rectangular base extension 47 is joined to the sidewall supporting portion 44 along fold line 43A and is separated from flap 45 by a cut edge 43B. The remaining edges are cut free. Slots 31A are provided in the floor portion 38 to permit fastening of the interlocking key portion of the backwall and roof member as will be explained hereafter.

Figure 9:
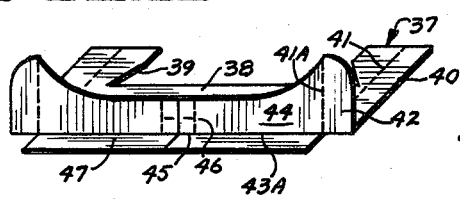
Figures 9 through 11 are isometric views showing successive steps followed in folding the base member.
Figure 10:
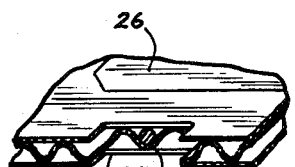

The supporting base is folded as shown in Figures 9 through 11. As shown in Figure 9, the first fold is made along fold lines 43 and 43A and cut 43B. The buttress portion 42, sidewall supporting portion 44 and flap 46 are all folded to project upwardly from the plane of member 37 and by so doing base extensions 47 are made to project downwardly. Base extensions 47 are then folded up, as shown in Figure 10, to again lie in the plane of the base member. The sidewall supporting member 44 is then folded forward along fold line 41A, as shown in Figure 11, until the base extensions 40 and 47 are aligned. Flap 45 is then folded inwardly on fold line 46 to embrace a corner of the superstructure.

As shown in Figures 12 and 13 the assembled superstructure formed from member 10 is set upon floor portion 38 of the base 37 and slid forward between the sidewall supporting members 44. When the forward corners butt against flaps 45 they are secured by suitable fasteners. It will be noted that the edges of flaps 45 butt against the edges of the corner reinforcing flaps 25 to complete the corner structure.

As shown in Figures 14 and 15 the backwall and roof member indicated generally at 48 comprises a rectangular backwall portion 49 having a width corresponding generally to the width of floor portion 12 and a height corresponding generally to the back edge of sidewall portion 18. Joined to one side of the back wall portion 49 along a fold line 50 there is a rectangular roof portion 51 of slightly larger dimensions so as to provide overhanging eaves. Joined to the opposite edge of back wall portion 49, along a fold line 52 is a key 53 of a size and shape to interlock with the keyway 39 in the base structure. A slot 31B is provided in the key portion to permit fastening of the key in its keyway.

The back wall and roof member is assembled to the base and superstructure as shown in Figure 16. For clarity, in this figure the superstructure is shown in broken lines. Key 53 is inserted in the keyway 39 in the base member. Suitable fasteners are inserted through slots 31A and 31B, in the manner shown generally in Figures 18 and 19, to hold the interlocked key securely in place. The back wall 49 is folded upwardly along fold line 52 until it meets the back wall supporting members 20. The roof portion 51 is then folded forwardly along fold line 50 until it meets interlocked roof supporting flaps 26 and 28. Fasteners are inserted to hold down the roof and the bed is completely assembled.

The exposed outer surfaces of the bed of this invention are desirably decorated, as for example by designs in simulation of human habitats. The wall and roof portions, for example, are printed or lithographed with design simulating log houses, clapboard houses, Spanish and adobe type architecture, stone houses and the like.

Additional fastening means may be used as necessary or desirable for added strength. For example, the back wall 49 may be additionally secured to back wall supporting members 17 and/or 20. In general, cats are less hard on a bed of this type than dogs and smaller dogs less so than larger dogs. Reinforcing corner elements 24 serve not only to strengthen the corners of the bed but also assist in retaining a pad or mat on the floor of the bed.

It will be noted that the supporting base structure 37 is not essential to the construction of the bed and may be dispensed with where the added support is not required. In that event key 53 may likewise be dispensed with as unnecessary and the back wall 49 is then secured by fastening to back wall supporting members 17 and/or 20.

In Figures 21 to 23 there is shown a modified form of bed construction in which some of the alternative features mentioned in the foregoing paragraphs are also embodied. Figure 21 is a plan view of the modified floor and sidewall structural member, indicated generally as 55. This member corresponds in most material respects to member 10 shown in Figures 1 and 2 and to this extent the numbering system has been preserved. Floor 12, front wall 16, back wall supporting portion 17, sidewalls 18 and back wall supporting portions 20 are all substantially the same in size and shape as previously described. The front edge 23B of sidewalls 18 corresponds generally to the arc defined by edge 23 and fold line 23A in Figure 1.

Fastening flap 19A corresponds generally to flap 19 in Figure 1 with the exception that it is formed as an extention of the front edge of sidewall 18, being joined to sidewall 18 along the fold line 13D. A cut edge 15C separates the flap 19A from the end of front wall 16. When the bed is assembled as shown in Figure 23, flap 19 folds around front wall 16 and is secured by any suitable fastener. The reinforcing corner structure has been omitted.

According to the modified form of construction no roof-supporting flaps are provided. Instead, the top edge 21A of back supporting portion 20 and the top edge 22B of sidewall 18 are provided with projecting tabs 56. Each tab 56 is preferably provided with a hole for receiving a fastening element. Member 55 is folded for assembly in generally the same manner shown for member 10 in Figures 3 to 5.

Figure 22 shows a plan view of a modified backwall and roof member to be used with floor and sidewall member 55. Back wall portion 49A is of a width corresponding to the width of floor 12 and a height corresponding to the height of the back edge 14A of sidewall 18. Roof portion 51A is somewhat wider, as shown, to provide for overhanging eaves. It is of a width slightly greater than the top edge of sidewall 18. The back wall and roof portions are joined along fold line 50A.

A plurality of slots 57 are provided in the roof portion 51A spaced in from the edges a distance corresponding to the width of the eaves and along fold line 50A. The slots 57 correspond in number and position to the tabs 56 on floor and sidewall member 55 when that member is folded for assembly. As shown in Figure 23 the roof portion 51A is placed on top of the assembled superstructure. Each of projecting tabs 56 extends through one of slots 57. The roof is held in place by pegs 58 inserted through the tabs as shown in Figure 23 or by similar fastening means. Alternatively, the tabs may simply be folded down and fastened.

In this form of assembly no reinforcing base structure has been used. Accordingly, the locking key has been omitted from the roof and back wall member. The backwall 49A is simply folded down against the supporting elements 17 and 20 and fastened. In the illustrated form of assembly members 20 have been folded inwardly first and member 17 has been folded up afterward in contrast to the order shown in Figure 5, although, obviously, it is immaterial which order is followed.

It is apparent that many modifications and variations of this invention as hereinbefore set forth may be made without departing from the spirit and scope thereof. The specific embodiments described are given by way of example only and the invention is limited only by the terms of the appended claims.

I claim as my invention:

1. A strong lightweight open-front animal bed adapted to be formed by folding flat sheets of corrugated paper board or the like which comprises a generally rectangular horizontal floor, a pair of vertical side walls extending upwardly from the opposite side edges of said floor, generally rectangular vertical back wall supporting members extending inwardly from the back edges of the vertical side walls, a relatively low vertical front wall extending upwardly from the front edge of said floor, the side walls having a portion cut away to meet the top of the front wall, means fastening the corners formed by the abutting front and side walls, a downwardly and rearwardly sloping roof covering the rearward portion only of said floor, said roof being supported by and secured to roof supporting flaps extending inwardly from the top edges of said vertical side walls, a roof supporting flap means extending forwardly from the top edge of each of said vertical back wall supporting members and interlocking with the roof supporting flap means projecting inwardly from the top edges of the side walls, said roof having overhanging eaves projecting beyond the fronts and sides of the top edges of said vertical side walls, and a vertical back wall extending downwardly from said roof and abutting the back edges of said side walls.

2. An animal bed according to claim 1 further characterized in that said interlocking flap means are provided respectively with cooperating tongues and grooves.

3. An animal bed according to claim 2 further characterized in that said roof supporting flaps are secured to each other by a plurality of elongated piercing fastening elements inserted between the plies of the flaps.

4. A strong lightweight open-front animal bed adapted to be formed by folding flat sheets of corrugated paper board or the like which comprises a generally rectangular horizontal floor, a pair of vertical side walls extending upwardly from the opposite side edges of said floor, a relatively low vertical front wall extending upwardly from the front edge of said floor, the side walls having a portion cut away to meet the top of the front wall, means fastening the corners formed by the abutting front and side walls, a downwardly and rearwardly sloping roof covering the rearward portion only of said floor, said roof being supported by and secured to the top edges of said vertical side walls, said roof having overhanging eaves projecting beyond the fronts and sides of the top edges of said vertical side walls, a vertical back wall extending downwardly from said roof and abutting the back edges of said side walls, and a supporting base including a horizontal member underlying the rearward portion of the floor of said bed, a pair of vertical buttresses extending upwardly from said horizontal base member adjacent to the outer surfaces of said vertical side walls and substantially perpendicular thereto, and a pair of vertical side wall supporting members extending forward from said buttresses along the outer surfaces of said side walls and secured to said bed.

5. An animal bed according to claim 4 further characterized in that a vertical fastening flap means extends inwardly from the forward edges of said sidewall supporting members around the front corners of said bed, said fastening flap means being secured to the vertical front wall.

6. An animal bed according to claim 4 further characterized in that further horizontal base members extend outwardly from the bottom edges of said sidewall supporting members.

7. An animal bed according to claim 4 further characterized in that said horizontal base member is provided with a keyway along its back edge and the bottom edge of said back wall is provided with a forwardly projecting horizontal interlocking key fit into and secured in the base keyway.

8. A strong lightweight open front animal bed adapted to be formed by folding flat sheets of corrugated paperboard which comprises a generally rectangular horizontal floor, a pair of vertical sidewalls extending upwardly from the opposite side edges of said floor, a relatively low vertical front wall extending upwardly from the front edge of said floor, the sidewalls having a portion cut away to meet the top of the front wall, fastening flap means extending about the corners formed by the abutting front and sidewalls, said flap means being secured to the adjacent wall surface, horizontal substantially right triangular reinforcing members extending inwardly from the top forward edge of said vertical sidewalls and having a vertically depending fastening flap means, said fastening flap means being secured to the vertical front wall, a generally rectangular relatively low vertical back wall supporting member extending upwardly from the back edge of the floor, generally rectangular vertical back wall supporting members extending inwardly from the back edges of each of the vertical sidewalls, a roof supporting flap means extending forwardly from the top edge of each of said last mentioned vertical back wall supporting members, a further roof supporting flap means extending inwardly from the top edges of each of said vertical sidewalls, said roof supporting flaps being interlocked and secured by a plurality of elongated piercing fasteners inserted between the plies of the flaps, a horizontal base member underlying the rearward portion of the floor of said bed, a pair of vertical buttresses extending upwardly from said base member adjacent to the outer surfaces of said vertical sidewalls and substantially perpendicular thereto, a pair of vertical sidewall supporting members extending forward from said buttresses along the outer surfaces of said sidewalls, vertical fastening flap means extending inwardly from the forward edges of said sidewall supporting members around the front corners of the bed, said fastening flap means being secured to the vertical front wall, a keyway in the back edge of said horizontal base member, a roof covering the rearward portion only of said floor overlying said roof supporting flap means and fastened thereto, a vertical back wall extending downwardly from said roof and abutting said vertical back supporting members, a forwardly projecting horizontal interlocking key extending from the bottom edge of said back wall, said key fit into and secured in the base keyway.

References Cited in the file of this patent
UNITED STATES PATENTS

| | | |
|---|---|---|
| 1,925,102 | Levkoff | Sept. 5, 1933 |
| 1,929,490 | Golden | Oct. 10, 1933 |
| 2,329,605 | Gladstein | Sept. 14, 1943 |
| 2,456,168 | Behrens | Dec. 14, 1948 |
| 2,568,204 | Reeser | Sept. 18, 1951 |
| 2,725,141 | Latvala | Nov. 29, 1955 |